United States Patent
Jang et al.

(12) United States Patent
(10) Patent No.: US 11,274,833 B2
(45) Date of Patent: Mar. 15, 2022

(54) OVEN

(71) Applicant: SAMSUNG ELECTRONICS CO., LTD., Suwon-si (KR)

(72) Inventors: Hyeong Jin Jang, Seoul (KR); Sang Jun Park, Yongin-si (KR); Han Jun Sung, Seoul (KR); Sang-jin Jeong, Yongin-si (KR); Yu Jeub Ha, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 16/625,477

(22) PCT Filed: Apr. 20, 2018

(86) PCT No.: PCT/KR2018/004608
§ 371 (c)(1),
(2) Date: Dec. 20, 2019

(87) PCT Pub. No.: WO2018/236039
PCT Pub. Date: Dec. 27, 2018

(65) Prior Publication Data
US 2021/0144286 A1    May 13, 2021

(30) Foreign Application Priority Data
Jun. 20, 2017 (KR) .................. 10-2017-0078014

(51) Int. Cl.
*F24C 15/36* (2006.01)
*H04N 5/225* (2006.01)

(52) U.S. Cl.
CPC ...... *F24C 15/36* (2013.01); *H04N 2005/2255* (2013.01)

(58) Field of Classification Search
None
See application file for complete search history.

(56) References Cited

U.S. PATENT DOCUMENTS 10,440,245 B1 * 10/2019 Johnson ............... H04N 5/2254
10,794,599 B2 * 10/2020 Jang ....................... F24C 7/085
(Continued)

FOREIGN PATENT DOCUMENTS

CN    106662332 A     5/2017
EP     2444734 A2     4/2012
(Continued)

OTHER PUBLICATIONS

Extended European Search Report dated Apr. 20, 2020 in European Patent Application No. 18820106.5.
(Continued)

*Primary Examiner* — Cynthia Segura
(74) *Attorney, Agent, or Firm* — Staas & Halsey LLP (57) ABSTRACT

Provided is an oven capable of preventing hot air inside a cooking chamber from flowing to a camera when a door is opened. The oven includes: a main body; a cooking chamber provided inside the main body, wherein a front side of the cooking chamber opens; a door installed on the main body to open and close the cooking chamber; a camera positioned above the cooking chamber, and configured to photograph an inside of the cooking chamber; and a barrier module positioned inside the camera, and configured to allow or block an inflow of outside air to the camera according to opening or closing of the door.

18 Claims, 9 Drawing Sheets

(56) References Cited

U.S. PATENT DOCUMENTS

| | | | |
|---|---|---|---|
| 11,047,578 B2 * | 6/2021 | Clayton | A21B 1/06 |
| 2007/0158340 A1 * | 7/2007 | Kim | F24C 15/006 |
| | | | 219/741 |
| 2012/0076351 A1 * | 3/2012 | Yoon | F24C 7/085 |
| | | | 382/100 |
| 2012/0076900 A1 * | 3/2012 | Yoon | F24C 7/085 |
| | | | 426/231 |
| 2014/0026762 A1 * | 1/2014 | Riefenstein | H05B 6/6441 |
| | | | 99/325 |
| 2016/0033143 A1 * | 2/2016 | Lee | F24C 15/006 |
| | | | 126/198 |
| 2016/0327279 A1 * | 11/2016 | Bhogal | A47J 36/321 |
| 2016/0348918 A1 | 12/2016 | Bhogal et al. | |
| 2017/0115008 A1 | 4/2017 | Erbe et al. | |
| 2018/0058702 A1 * | 3/2018 | Jang | F24C 15/322 |
| 2018/0372326 A1 * | 12/2018 | Park | F24C 3/128 |
| 2019/0234617 A1 * | 8/2019 | Bhogal | A23L 5/15 |
| 2019/0316780 A1 * | 10/2019 | Yun | F24C 15/006 |
| 2019/0360702 A1 * | 11/2019 | Lee | F24C 15/002 |
| 2020/0166276 A1 * | 5/2020 | Garuccio | F24C 15/16 |
| 2020/0217512 A1 * | 7/2020 | Clayton | F24C 7/046 |
| 2020/0258408 A1 * | 8/2020 | Nolan | F24C 15/2042 |
| 2021/0003289 A1 * | 1/2021 | Iwamoto | F24C 7/087 |
| 2021/0037619 A1 * | 2/2021 | Armstrong | H05B 6/642 |
| 2021/0095864 A1 * | 4/2021 | Nakashima | F24C 15/006 |

FOREIGN PATENT DOCUMENTS

| | | |
|---|---|---|
| EP | 3091291 A1 | 11/2016 |
| JP | 5-173649 A | 7/1993 |
| JP | 2003-56852 | 2/2003 |
| JP | 3402162 | 4/2003 |
| KR | 2001-0008977 A | 2/2001 |
| KR | 10-0826704 B1 | 4/2008 |
| KR | 10-0826708 B1 | 4/2008 |
| KR | 10-1263519 | 5/2013 |
| KR | 10-2017-0055856 A | 5/2017 |
| WO | 2017/082603 A1 | 5/2017 |

OTHER PUBLICATIONS

Chinese First Office Action for Chinese Application No. 201880041754.8 dated Jul. 14, 2021 (11 pages including translation).

Korean Office Action for Korean Application No. 10-2017-0078014 dated May 27, 2021 (15 pages including translation).

Korean Office Action dated Nov. 23, 2021, for Korean Patent Application No. 10-2017-0078014 (3 pages including translation).

* cited by examiner

OVEN

CROSS-REFERENCE TO RELATED APPLICATIONS

This application is a U.S. National Stage Application which claims the benefit under 35 U.S.C. § 371 of International Patent Application No. PCT/KR2018/004608 filed on Apr. 20, 2018, which claims foreign priority benefit under 35 U.S.C. § 119 of Korean Patent Application No. 10-2017-0078014 filed on Jun. 20, 2017 in the Korean Intellectual Property Office, the contents of both of which are incorporated herein by reference.

TECHNICAL FIELD

The disclosure relates to an oven including a camera for photographing the inside of a cooking chamber.

BACKGROUND ART

Generally, an oven is an apparatus that cooks food by including a cooking chamber, a heating device for applying heat to the cooking chamber, and a circulation fan for circulating the heat generated by the heating device inside the cooking chamber.

Ovens, which are equipment for cooking food by sealing and heating the food, are generally classified into an electric type, a gas type, and an electronic type according to heat sources.

Electric ovens use an electric heater as a heating source, and gas ovens and microwaves use heat generated by gas and frictional heat of water molecules caused by high frequencies as heat sources, respectively.

Generally, an oven includes a main body forming an outer appearance, wherein the front side of the main body opens to form a cooking chamber in which food to be cooked is put, and a door provided on the front side of the main body to selectively open or close the cooking chamber.

During a cooking process, it is necessary to check a cooking state of food inside the cooking chamber. To this end, the oven is provided with a camera to photograph the inside of the cooking chamber.

The camera is positioned adjacent to the cooking chamber to photograph the inside of the cooking chamber. Because the inside of the cooking chamber is maintained at high temperature during a cooking process, the temperature of the camera rises, which may damage the camera. In some cases, a fan is installed in the oven to prevent the camera from being damaged. The fan sucks outside air to cool the camera.

However, when the door is opened during cooking, hot air in the cooking chamber is concentrated onto the camera by the fan, which may damage the camera. Furthermore, when contaminated air in the cooking chamber flows toward the camera, the image quality of the camera may be degraded.

DISCLOSURE

Technical Problem

One aspect of the disclosure is directed to providing an oven capable of preventing hot air inside a cooking chamber from flowing toward a camera.

Another aspect of the disclosure is directed to providing an oven including a barrier module for blocking or allowing an inflow of outside air to a camera when a door is opened or closed.

Technical Solution

One aspect of the disclosure provides an oven including: a main body; a cooking chamber provided inside the main body, wherein a front side of the cooking chamber opens; a door installed on the main body to open or close the cooking chamber; a camera positioned above the cooking chamber, and configured to photograph an inside of the cooking chamber; and a barrier module inside which the camera is positioned, the barrier module configured to allow or block an inflow of outside air to the camera when the door is opened or closed.

The barrier module may allow outside air to flow to the camera when the door is in a closed state, and may block outside air from flowing to the camera when the door is in an opened state.

The barrier module may include an air guide forming a passage communicating the camera with an outside of the main body such that outside air flows to the camera, and a barrier rotatably mounted on one side of the air guide.

The barrier may rotate to open or close the passage.

The barrier module may further include a push pin moving forward or backward when the door is opened or closed, and the push pin may include an auxiliary pin extending in a direction crossing the push pin.

The barrier module may further include a link connector including a first hole in which the auxiliary pin is inserted and a second hole in which one end of the barrier is inserted.

The link connector may rotate in a first direction together with the barrier when the push pin moves forward, and may rotate in a second direction that is opposite to the first direction together with the barrier when the push pin moves backward.

The barrier may close the passage when the barrier rotates in the first direction, and may open the passage when the barrier rotates in the second direction.

One end of the passage may be provided with an inlet through which outside air is introduced, and the inlet may be positioned in a front, upper portion of the main body.

The oven may further include a camera cooling fan positioned above the camera, and configured to suck outside air toward the camera to cool the camera.

The barrier module may further include a first elastic member elastically biasing the push pin to move the push pin forward.

The barrier module may further include a second elastic member elastically biasing the link connector to rotate the link connector in the first direction.

The barrier module may further include a motor configured to rotate the barrier such that the barrier opens or closes the passage.

The motor may rotate the barrier such that the barrier closes the passage when the door is opened, and the motor may rotate the barrier such that the barrier opens the passage when the door is closed.

The motor may rotate the barrier such that the barrier closes the passage when temperature of the passage rises to predetermined temperature or higher, and the motor may rotate the barrier such that the barrier opens the passage when the temperature of the passage falls to predetermined temperature or less.

Another aspect of the disclosure provides an oven including: a main body; a cooking chamber provided inside the main body, wherein a front side of the cooking chamber opens; a door installed on the main body to open or close the cooking chamber; a camera positioned above the cooking chamber, and configured to photograph an inside of the cooking chamber; a passage communicating an upper space of the cooking chamber with an outside of the main body such that outside air flows to the camera; a camera cooling fan positioned above the camera, and configured to suck outside air through the passage to cool the camera; and a barrier module configured to close or open the passage when the door is opened or closed.

The barrier module may include a push pin moving forward or backward when the door is opened or closed, and a barrier being rotatable, and opening or closing the passage when the barrier rotates.

The barrier module may further include a link connector connected to the push pin and the barrier, rotating in a first direction together with the barrier when the push pin moves forward, and rotating in a second direction that is opposite to the first direction together with the barrier when the push pin moves backward.

The barrier module may further include: a first elastic member elastically biasing the push pin to move the push pin forward; and a second elastic member elastically biasing the link connector to rotate the link connector in the first direction.

Another aspect of the disclosure provides an oven including: a main body; a cooking chamber provided inside the main body, wherein a front side of the cooking chamber opens; a door installed on the main body to open and close the cooking chamber; a camera positioned above the cooking chamber, and configured to photograph an inside of the cooking chamber; a passage guiding outside air to the camera; and a barrier module configured to open the passage when the door is closed and to close the passage when the door is opened.

Advantageous Effects

According to an idea of the disclosure, an oven capable of preventing hot air inside a cooking chamber from flowing toward a camera may be provided.

According to an idea of the disclosure, an oven including a barrier module for blocking or allowing an inflow of outside air to a camera when a door is opened or closed may be provided.

MODE OF THE INVENTION

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

The terms used in the present specification are merely used to describe embodiments, and are not intended to limit the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms "first," "second," etc. may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

Meanwhile, in the following description, the terms "front end", "rear end", "upper portion", "lower portion", "upper end", "lower end", etc. are defined based on the drawings, and the shapes and positions of the components are not limited by the terms.

Hereinafter, embodiments of the disclosure will be described in detail with reference to the accompanying drawings.

Figure 1:
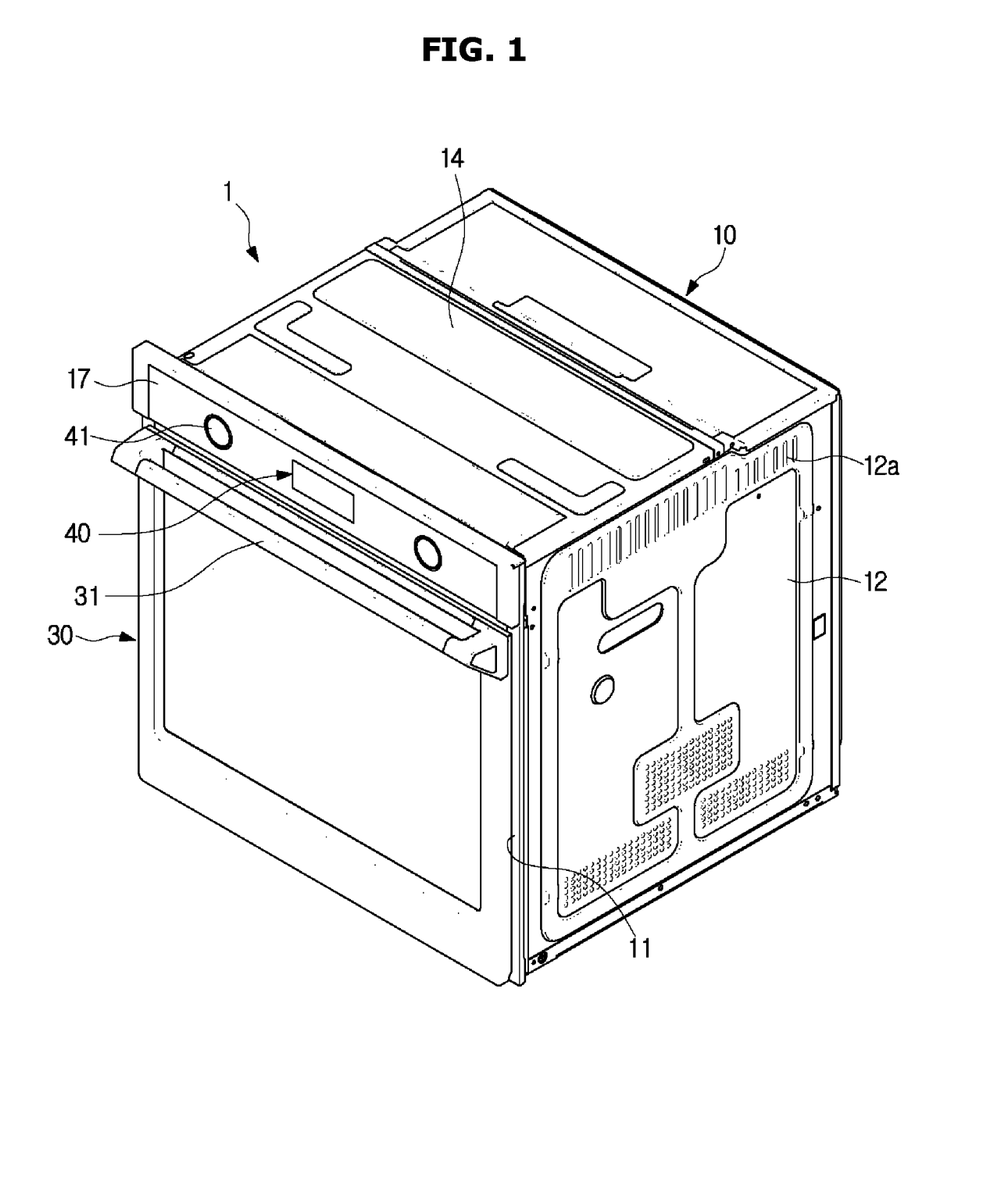
FIG. 1 is a perspective view of an oven according to an embodiment of the disclosure.
Figure 2:
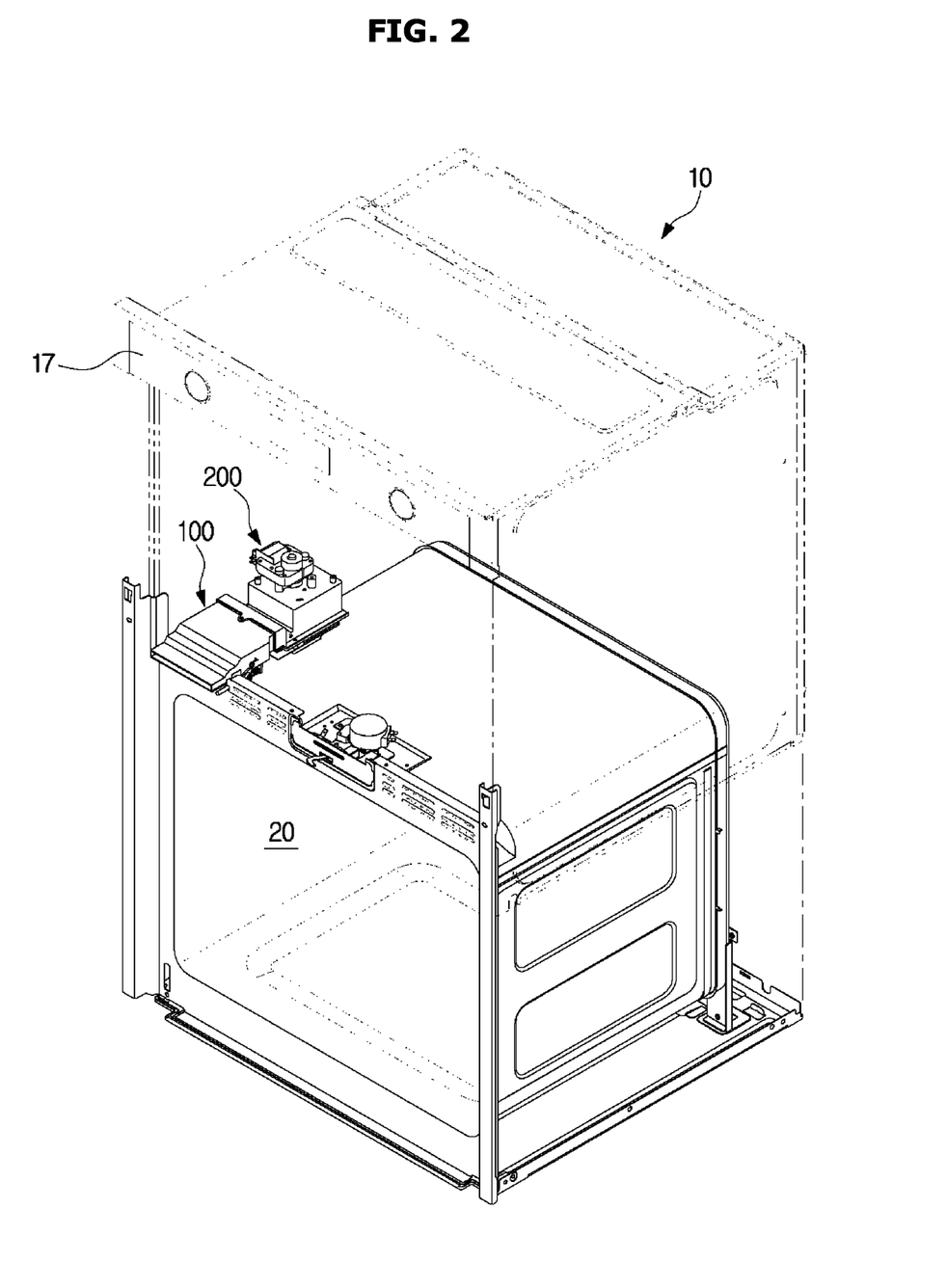
FIG. 2 shows main components of the oven according to an embodiment of the disclosure.
Figure 3:
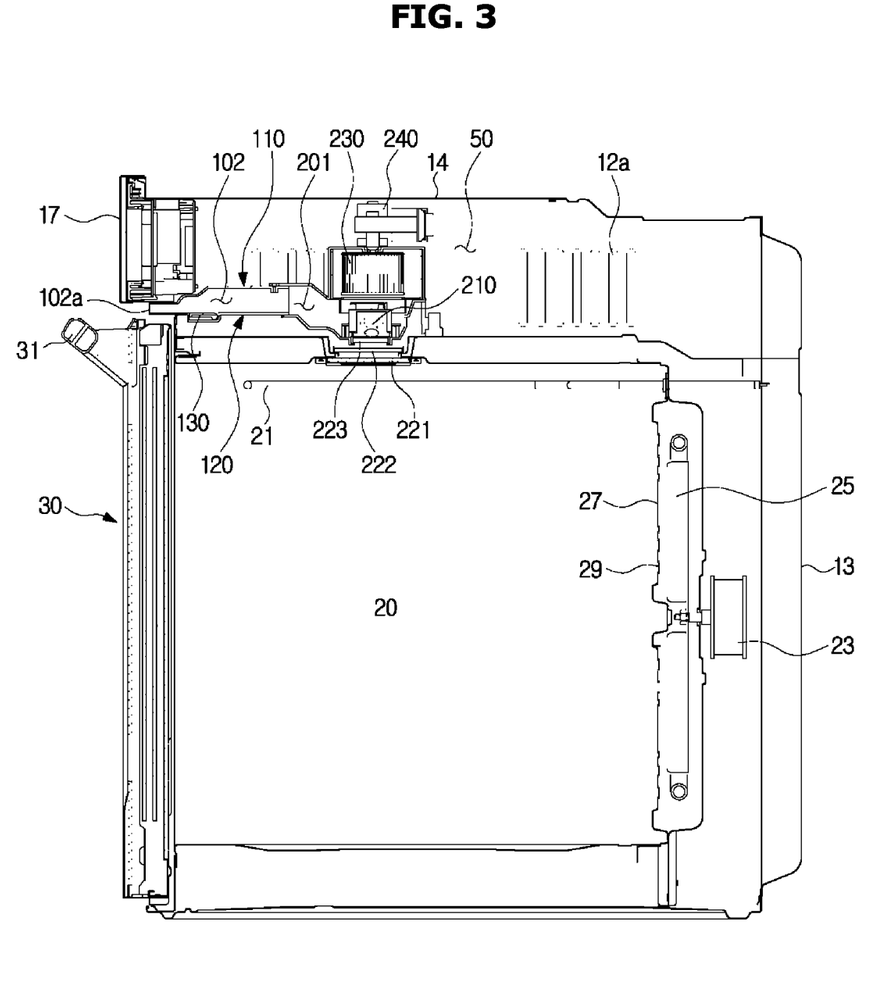
FIG. 3 is a side cross-sectional view of the oven according to an embodiment of the disclosure.

FIG. 1 is a perspective view of an oven according to an embodiment of the disclosure, FIG. 2 shows main components of the oven according to an embodiment of the disclosure, and FIG. 3 is a side cross-sectional view of the oven according to an embodiment of the disclosure.

As illustrated in FIGS. 1 to 3, an oven 1 may include a main body 10 forming an outer appearance, a cooking chamber 20 provided inside the main body 10, wherein a front side of the cooking chamber 20 opens, and a door 30 provided on a front side of the main body 10 to open or close the cooking chamber 20.

The main body 10 may include a front panel 11 forming a front surface of the main body 10, a side panel 12 forming sides of the main body 10, a rear panel 13 forming a rear surface of the main body 10, and an upper panel 14 forming a top of the main body 10.

On an upper portion of the front surface of the front panel 11, a machine room cover 17 may be positioned to cover a front side of a machine room 50, which will be described later, and on the machine room cover 17, a display module 40, which will be described later, may be mounted.

In the side panel 12, an inlet 12a may be formed such that air may be sucked into the machine room 50. Outside air sucked into the machine room 50 through the suction port 12a may flow into the machine room 50 to cool electronic components.

A plurality of supports (not shown) may be mounted on opposite inner sidewalls of the cooking chamber 20, and a rack (not shown) on which food may be placed may be mounted on the plurality of supports.

A divider (not shown) capable of dividing the cooking chamber 20 into a plurality of cooking chambers may be detachably mounted on the plurality of supports.

The plurality of cooking chambers divided by the divider may need not to have the same size, and may have different sizes. The divider may be made of an insulating material to insulate the individual cooking chambers.

Through the configuration, the plurality of cooking chambers may be variously utilized according to a user's intention.

In the cooking chamber 20, a heater 21 for heating food may be installed, and the heater 21 may be an electric heater including an electric resistor.

However, the heater 21 is not limited to the electric heater. That is, the heater 21 may be a gas heater that generates heat by burning gas.

Thus, the oven 1 may include an electric oven and a gas oven.

Behind the cooking room 20, a circulation fan 25 for circulating air in the cooking chamber 20 to evenly heat food to be cooked, and a circulation motor 23 for driving the circulation fan 25 may be provided.

In a front side of the circulation fan 25, a fan cover 27 may be provided to cover the circulation fan 25, and in the fan cover 27, a through hole 29 may be formed to allow air to flow.

The open front side of the cooking chamber 20 may be opened and closed by the door 30, and the door 30 may be hinged to a lower portion of the main body 10 to be rotatable with respect to the main body 10.

In a front, upper portion of the door 30, a door handle 31 which a user may grip to open or close the cooking chamber 20 may be provided.

The display module 40 which may display information about various operations of the oven 1 and allow the user to input operation commands may be mounted on the machine room cover 17 provided on the front, upper portion of the front panel 11, and on the machine room cover 17, a control panel 41 for additionally operating the oven 1 may be provided.

The oven 1 may be provided with the machine room 50 that accommodates electronic components (not shown) for controlling operations of various accessories including the display module 40.

The machine room 50 may be positioned above the cooking chamber 20, and an insulator (not shown) may be provided between the machine room 50 and the cooking chamber 20 to insulate the machine room 50 from the cooking chamber 20 to prevent heat inside the cooking chamber 20 from being transferred to the machine room 50.

The insulator may cover the entire outer surface of the cooking chamber 20, as well as between the machine room 50 and the cooking chamber 20, to prevent heat inside the cooking chamber 20 from being transferred to an outside of the oven 1.

The oven 1 may include a camera 210 positioned above the cooking chamber 20 to photograph the inside of the cooking chamber 20. The camera 210 may be positioned inside the machine room 50.

During the cooking process, the inside of the cooking chamber 20 may be maintained at high temperature. The camera 210 may be positioned adjacent to the cooking chamber 20 to photograph the inside of the cooking chamber 20. Because the camera 210 is positioned adjacent to the cooking chamber 20, the temperature of the camera 210 may rise, which may damage the camera 210. To prevent the camera 210 from being damaged, the oven 1 may include a camera cooling fan 230 positioned above the camera 210.

The camera cooling fan 230 may suck outside air to cool the camera 210. The camera cooling fan 230 may include a sirocco fan. The camera cooling fan 230 may suck air outside the main body 10 to cool the camera 210. The camera cooling fan 230 may suck outside air from in front of and above the cooking chamber 20 to cool the camera 210.

However, when the door 30 opens and the front side of the cooking chamber 20 opens, hot air inside the cooking chamber 20 may flow out forward from the cooking chamber 20. Hot air rises because the hot air has relatively low density compared to cold air. In this case, when the camera cooling fan 230 sucks outside air, hot air flowing out of the cooking chamber 20 may flow to the camera 210. When hot air flows to the camera 210, the temperature of the camera 210 may rise, which may damage the camera 210.

To prevent the hot air inside the cooking chamber 20 from flowing to the camera 210, the oven 1 according to an idea of the disclosure may include a barrier module 100.

The barrier module 100 may allow or block an inflow of outside air to the camera 210 when the door 30 is opened or closed. When the door 30 is in a closed state, the barrier module 100 may allow outside air to flow to the camera 210. When the door 30 is in an opened state, the barrier module 100 may block outside air from flowing to the camera 210.

Therefore, according to the disclosure, even when the door 30 is opened so that hot air inside the cooking chamber 20 flows out of the main body 10, the hot air may not flow to the camera 210. Because hot air does not flow to the camera 210, the temperature of the camera 210 may be prevented from rising, and accordingly, the camera 210 may be prevented from being damaged.

Figure 4:
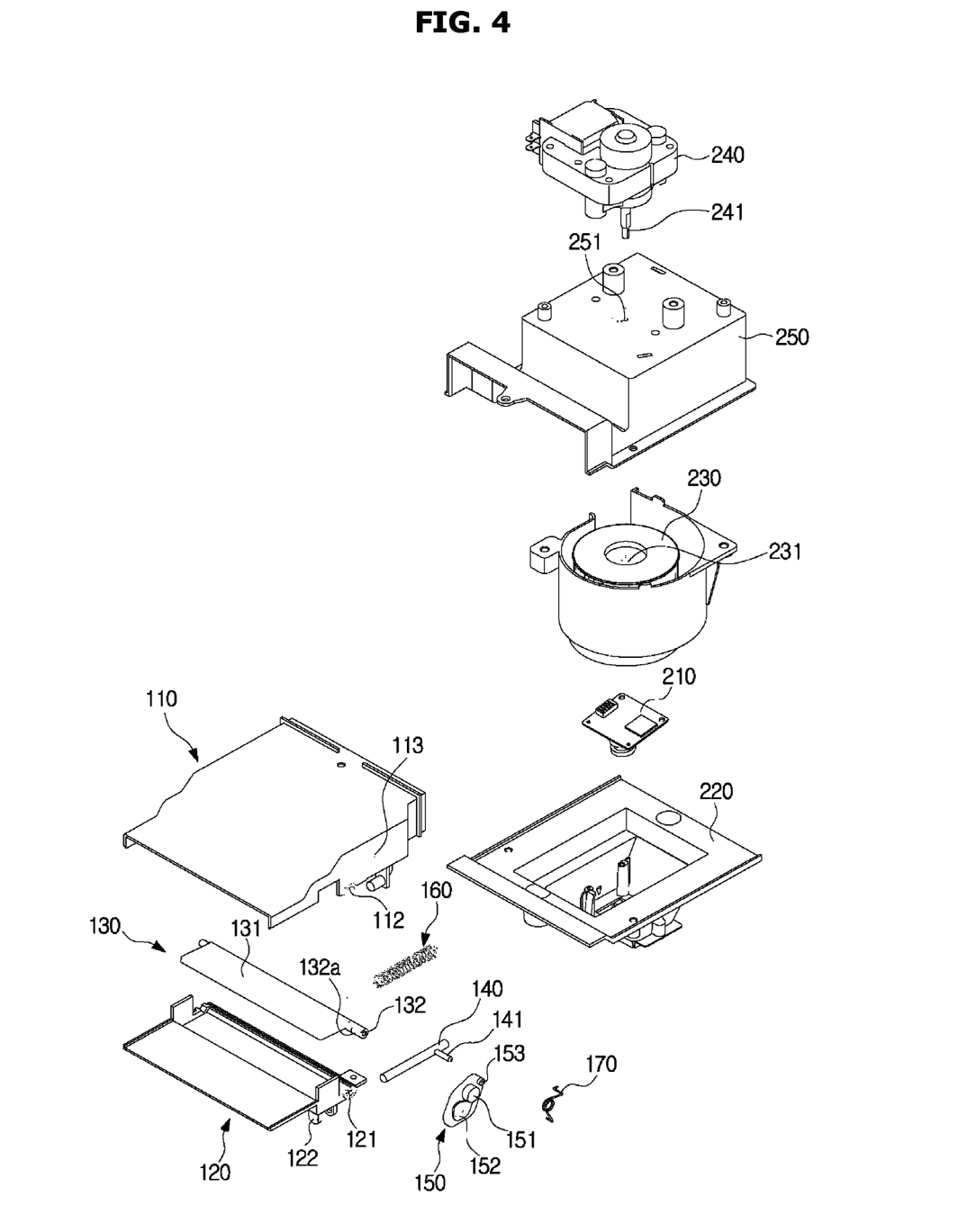
FIG. 4 is an exploded perspective view of a barrier module and peripheral components in the oven according to an embodiment of the disclosure.
Figure 5:
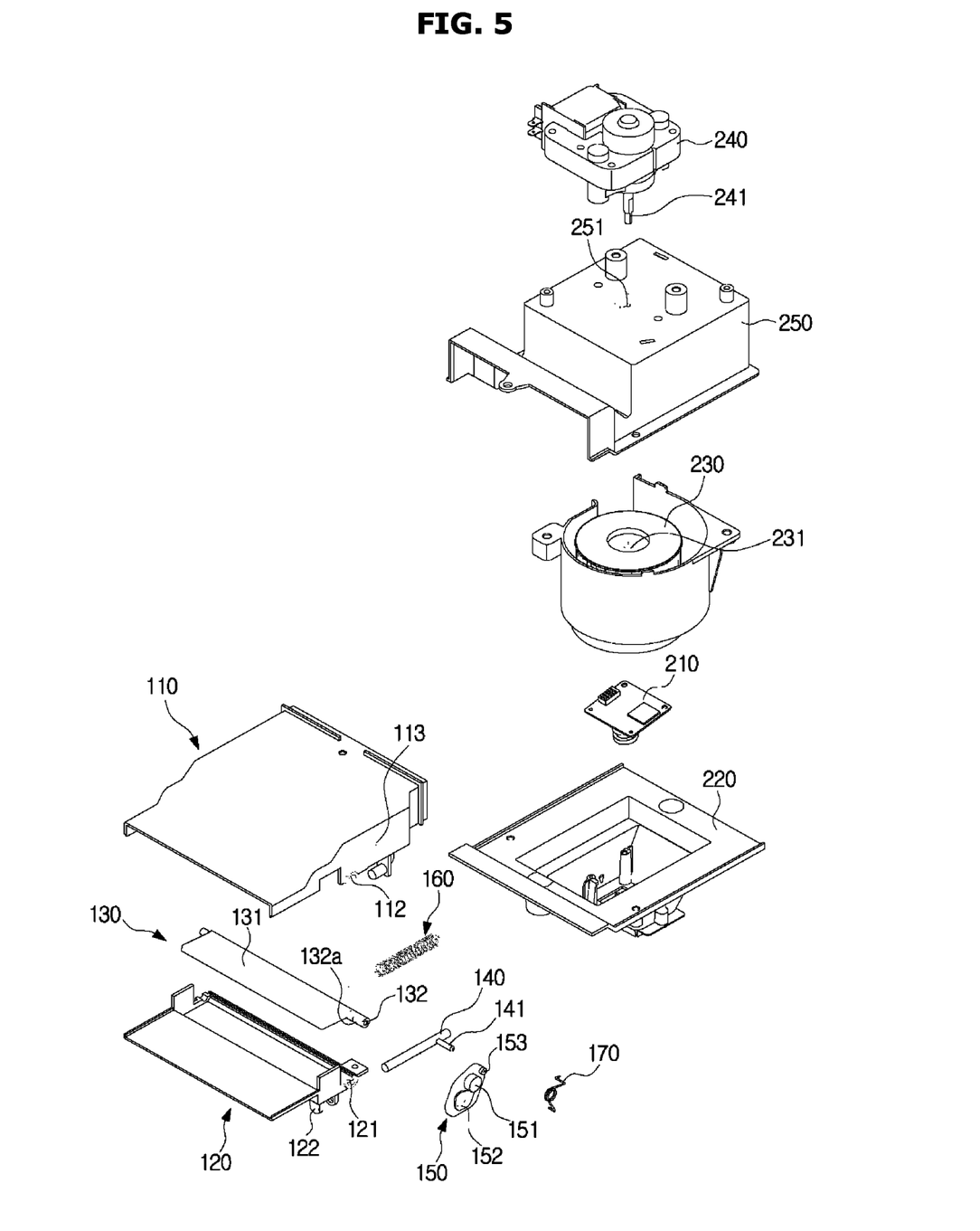
FIG. 5 shows a rotation operation of a barrier in the oven according to an embodiment of the disclosure.
Figure 6:
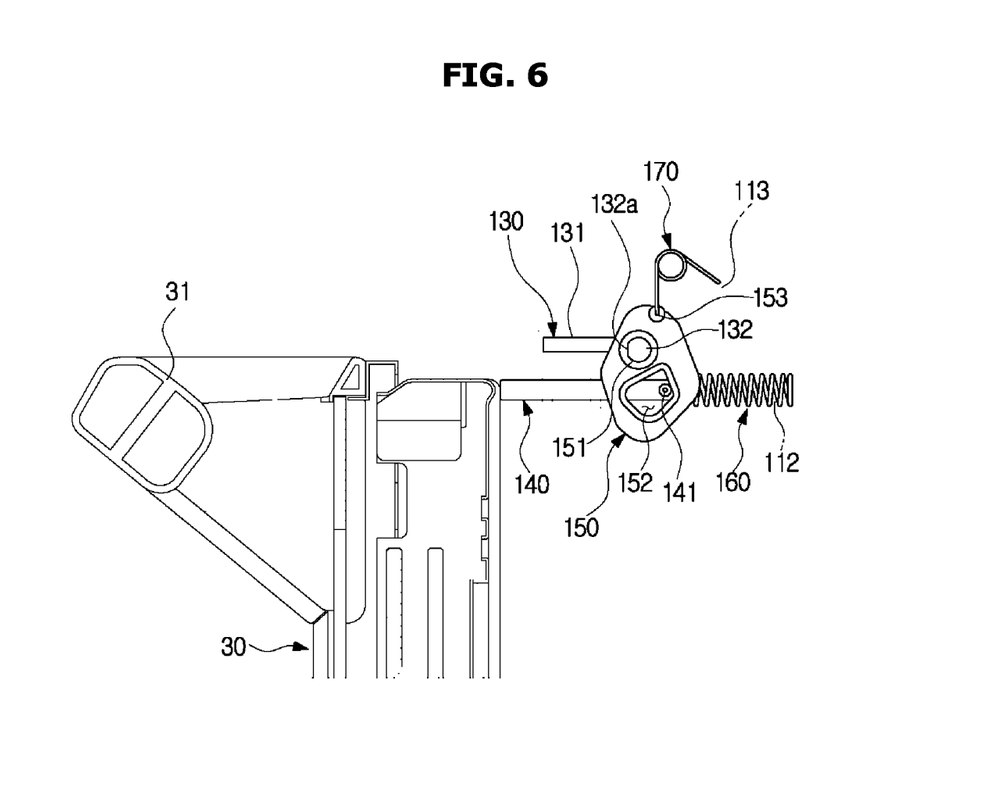
FIG. 6 shows some components of the barrier module when a door is in a closed state in the oven according to an embodiment of the disclosure.
Figure 7:
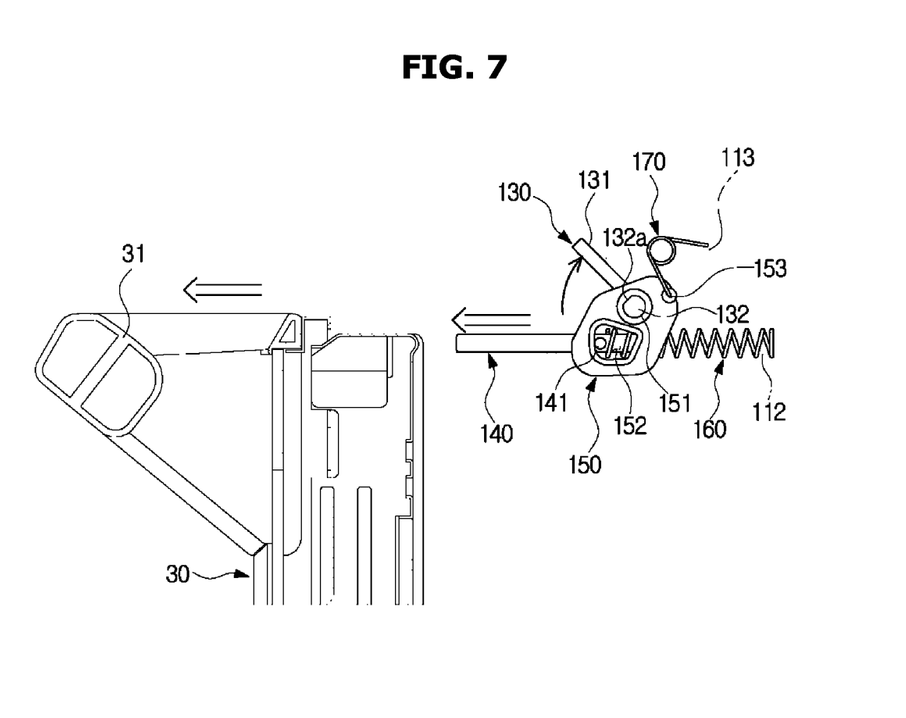
FIG. 7 shows some components of the barrier module when the door is in an opened state in the oven according to an embodiment of the disclosure.

FIG. 4 is an exploded perspective view of the barrier module and peripheral components in the oven according to an embodiment of the disclosure. FIG. 5 shows a rotation operation of a barrier in the oven according to an embodiment of the disclosure. FIG. 6 shows some components of the barrier module when the door is in a closed state in the oven according to an embodiment of the disclosure. FIG. 7 shows some components of the barrier module when the door is in an opened state in the oven according to an embodiment of the disclosure.

Hereinafter, a structure of the barrier module 100 will be described in detail.

The barrier module 100 may include an air guide 101. The air guide 101 may include an upper air guide 110, and a lower air guide 120 that may be coupled to the upper air guide 110.

The upper air guide 110 may be coupled to the lower air guide 120 to form a first passage 102. The first passage 102 may communicate the camera 210 with the outside of the main body 10 so that outside air flows in. Outside air sucked by the camera cooling fan 230 may cool the camera 210 via the first passage 102.

The upper air guide 110 may include an upper barrier groove 111. The lower air guide 120 may include a lower barrier groove 121. When the upper air guide 110 is coupled to the lower air guide 120, the upper barrier groove 111 may be coupled to the lower barrier groove 121 to form a barrier hole (not shown).

The barrier module 100 may include a barrier 130 rotatably mounted between the upper air guide 110 and the lower air guide 120.

The barrier 130 may include a blocking portion 131 being in the shape of a plate, and a shaft portion 132 provided at both ends of the blocking portion 131.

The blocking portion 131 may block the first passage 102 to block an inflow of outside air when the door 30 is opened. An area of the blocking portion 131 may correspond to a cross-sectional area of the first passage 102 that is closed by the blocking portion 131.

The barrier 130 may rotate on the shaft portion 132 that is a rotation shaft. The barrier 130 may be rotatably coupled to the air guide 101 by inserting the shaft portion 132 into the barrier hole (not shown).

The shaft portion 132 of the barrier 130 may be inserted into the barrier hole (not shown). A diameter of the barrier hole may be greater than an external diameter of the shaft portion 132. Thus, the shaft portion 132 inserted into the barrier hole may rotate in the barrier hole. Thereby, the barrier 130 may be rotatably coupled to the air guide 101.

When the barrier 120 rotates, the barrier 130 may open or close the first passage 102. When the barrier 130 rotates in a first direction, the barrier 130 may close the first passage 102. When the barrier 130 rotates in a second direction, the barrier 130 may open the first passage 102.

The barrier 130 may rotate when the door 30 is opened or closed.

When the door 30 is opened, the barrier 130 may rotate in the first direction to close the first passage 102. Therefore, when the door 30 is in an opened state, the first passage 102 may be closed so that outside air may not flow to the camera 210.

When the door 30 is closed, the barrier 130 may rotate in the second direction to open the first passage 102. Therefore, when the door 30 is in a closed state, the first passage 102 may be opened so that outside air may flow to the camera 210.

The barrier module 100 may include a push pin 140 and a link connector 150.

The push pin 140 may be in the shape of a cylinder. The push pin 140 may include an auxiliary pin 141 extending in a direction crossing the push pin 140.

The push pin 140 may move forward or backward when the door 30 is opened or closed.

When the door 30 is closed, a rear surface of the door 30 may contact the push pin 140. At this time, the door 30 may rotate to move the push pin 140 backward. When the door 30 is closed, the door 30 may push the push pin 140 backward so that the push pin 140 may move backward.

When the door 30 is opened, the push pin 140 may move forward. This is because a first elastic member 160, which will be described later, applies an elastic force to move the push pin 140 forward, which will be described later.

The link connector 150 may include a first hole 151 in which the shaft portion 132 of the barrier 130 is inserted, and a second hole 152 in which the auxiliary pin 141 is inserted.

The shaft portion 132 may include a relative rotation preventing portion 132a. The relative rotation preventing portion 132a may be formed by flattening an area of a surface of the shaft portion 132. The relative rotation preventing portion 132a may prevent the shaft portion 132 from rotating relative to the first hole 151. The relative rotation preventing portion 132a may deform a cross section of the shaft portion 132 to a predetermined shape that is different from a circle. A cross section of the first hole 151 may correspond to the cross section of the shaft portion 132. Thereby, when the shaft portion 132 is inserted into the first hole 151, the shaft portion 132 may be prevented from rotating relative to the first hole 151. However, the shape of the relative rotation preventing portion 132a is not limited as long as the relative rotation preventing portion 132a prevents the shaft portion 132 from rotating relative to the first hole 151.

Because the shaft portion 132 is prevented from rotating relative to the first hole 151, the shaft portion 132 may rotate together with the link connector 120 when the link connector 150 rotates.

The auxiliary pin 141 may be inserted in the second hole 152. A cross section of the second hole 152 may be larger than a cross section of the auxiliary pin 141. Therefore, the auxiliary pin 141 in the second hole 152 may move together with the push pin 140 when the push pin 140 moves. When the door 30 is closed, the auxiliary pin 141 may move backward together with the push pin 140 to come into contact with a part of a rear end of the second hole 152. When the door 30 is opened, the auxiliary pin 141 may move forward together with the push pin 140 to come into contact with a part of a front end of the second hole 152.

The link connector 150 may rotate in the first direction when the door 30 is opened. When the door 30 is closed, the link connector 150 may rotate in the second direction that is opposite to the first direction. When the link connector 150 rotates in the first direction, the barrier 130 may close the first passage 102. When the link connector 150 rotates in the second direction, the barrier 130 may open the first passage 102.

The barrier module 100 may include the first elastic member 160 for elastically biasing the push pin 140 to move the push pin 140 forward, and a second elastic member 170 for elastically biasing the link connector 150 to rotate in the first direction.

The first elastic member 160 may include a compression spring. A protrusion 112 provided on the upper air guide 110 may be inserted in one end of the first elastic member 160. A rear end of the push pin 140 may be inserted in the other end of the first elastic member 160. The first elastic member 160 may provide an elastic force such that the push pin 140 is spaced away from the protrusion 112. The upper air guide 110 may be fixed above the cooking chamber 20. Therefore, when the first elastic member 160 provides an elastic force such that the push pin 140 is spaced away from the protrusion 112, the push pin 140 may move forward. When the push pin 140 moves backward, the push pin 140 may approach the protrusion 112 so that the first elastic member 160 may store an elastic force.

The link connector 150 may further include a third hole 153 in which one end of the second elastic member 170 is inserted.

The second elastic member 170 may include a torsion spring. One end of the second elastic member 170 may be inserted in the third hole 153 of the link connector 150. The other end of the link connector 150 may be inserted in an insertion hole 113 formed in the upper air guide 110. The second elastic member 170 may provide an elastic force so that the link connector 150 rotates in the first direction. When the door 30 is closed, the second elastic member 170 may store an elastic force. When the door is opened, the second elastic member 170 may provide an elastic force to rotate the link connector 150 in the first direction. As described above, when the link connector 150 rotates in the first direction, the barrier 130 may close the first passage 102. In contrast, when the link connector 150 rotates in the second direction, the barrier 130 may open the first passage 102.

When the push pin 140 moves forward, the auxiliary pin 141 may come into contact with a part of the front end of the second hole 152, and the link connector 150 may rotate in the first direction. When the push pin 140 moves backward, the auxiliary pin 141 may come into contact with a part of the rear end of the second hole 152, and the link connector 150 may rotate in the second direction.

Therefore, when the push pin 140 moves forward, the barrier 130 may close the first passage 102. When the push pin 140 moves backward, the barrier 130 may open the first passage 102.

According to an embodiment of the disclosure, the oven 1 may include a camera module 200.

The camera module 200 may include the camera 210 for photographing the inside of the cooking chamber 20, a camera holder 220 on which the camera 210 is mounted, the camera cooling fan 230 for cooling the camera 210 by sucking outside air, a motor 240 for providing power to the camera cooling fan 230, and a fan cover 250 coupled to the camera holder 220 to form a second passage 201.

The camera module 200 may be positioned above the cooking chamber 20. The camera module 200 may be positioned in the machine room 50.

A first glass 221, a second glass 222, and a third glass 223 may be mounted on the camera holder 220. The first glass 221 may be installed in an opening formed in the top of the cooking chamber 20. The second glass 222 may be positioned above the first glass 221 in such a way to be spaced a predetermined distance from the second glass 222. The third glass 223 may be positioned above the second glass 222. The camera 210 may be positioned above the third glass 223.

The first, second, and third glasses 221, 222, and 223 may be made of the same material or different materials. The first, second, and third glasses 221, 222, and 223 may be made of a transparent material. Thereby, the camera 210 may photograph the inside of the cooking chamber 20 through the opening even above the first, second, and third glasses 221, 222, and 223.

By providing the first, second, and third glasses 221, 222, and 223, the machine room 50 may be insulated from the cooking chamber 20. Thereby, the camera 210 may be prevented from being damaged due to a rise in temperature of a predetermined temperature or higher.

Meanwhile, the number of the glasses may change. For example, the number of the glasses may be two or less, or the number of the glasses may be four or more.

The fan cover 250 may be coupled to the camera holder 220 to form the second passage 201. The second passage 201 may be connected to one end of the first passage 102. The camera 210 may communicate with the outside of the main body 10 by connecting the first passage 102 to the second passage 201. Outside air sucked by the camera cooling fan 230 may cool the camera 210 through the first passage 102 and the second passage 201.

The motor 240 may include a motor shaft 241. The motor shaft 241 may be inserted in a motor shaft hole 251 formed in the fan cover 250. The camera cooling fan 230 may be positioned inside the fan cover 250. The motor shaft 241 may be inserted in the through hole 231 of the camera cooling fan 230 and connected to the camera cooling fan 230. Because the motor shaft 241 is connected to the camera cooling fan 230, the camera cooling fan 230 may rotate by a driving force of the motor 240. The camera cooling fan 230 may be positioned above the camera 210. The camera 210 may be installed in the camera holder 220. When the fan cover 250 is coupled to the camera holder 220, the camera cooling fan 230 and the camera 210 may be positioned inside the fan cover 250 and the camera holder 220.

As illustrated in FIG. 2, according to an embodiment of the disclosure, the barrier module 100 and the camera module 200 may be positioned above the cooking chamber 20 or adjacent to the side panel 12. In other words, the barrier module 100 and the camera module 200 may be positioned at a side of the machine room 50. In this case, the barrier module 100 may be positioned such that an inlet 102a of the first passage 102 is toward a front direction from the cooking chamber 20. Thereby, the camera cooling fan 230 may suck outside air from around a front corner of the cooking chamber 20, instead of around a front center of the cooking chamber 20.

When the door 30 is opened during the cooking process, hot air inside the cooking chamber 20 may flow out forward from the cooking chamber 20. At this time, the hot air rises because the hot air has relatively low density. Cavitation is caused by the rising hot air. Hot air is concentrated in the center because the surrounding cold air fills an empty space formed by the cavitation. Therefore, the hot air may be concentrated around the front center of the cooking chamber 20. Air of relatively low temperature may be collected around front corners of the cooking chamber 20.

When the barrier module 100 is positioned at a side of the machine room 50, the first passage 102 and the second passage 201 may communicate the camera 210 with an outside space around a front corner of the cooking chamber 20. Because air of relatively low temperature is collected around the front corner of the cooking chamber 20, the camera 210 may be prevented from being damaged even when the barrier module 100 operates abnormally so that the first passage 102 is not blocked, That is, the probability that the camera 210 will be damaged by hot air may be lowered.

Figure 8:
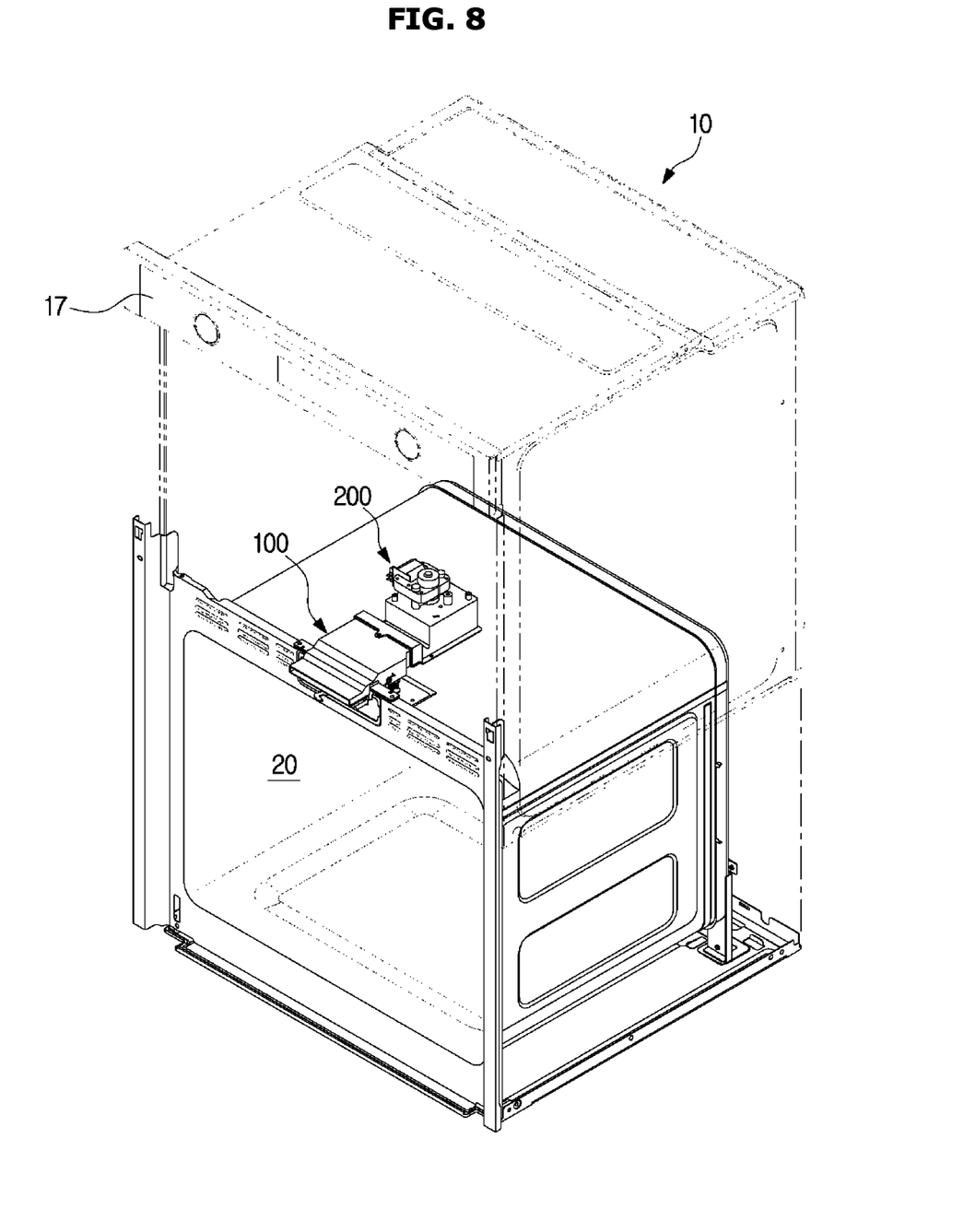
FIG. 8 shows main components of an oven according to another embodiment of the disclosure.

FIG. 8 shows main components of an oven according to another embodiment of the disclosure.

As illustrated in FIG. 8, in the oven according to another embodiment of the disclosure, the barrier module 100 and the camera module 200 may be positioned on a top center of the cooking chamber 20. According to an idea of the disclosure, when the door 30 is opened, no outside air may flow to the camera 210. Accordingly, the barrier module 100 and the camera module 200 may be positioned in a front center of the machine room 50 regardless of whether hot air is concentrated in the front center of the cooking chamber 20.

Figure 9:
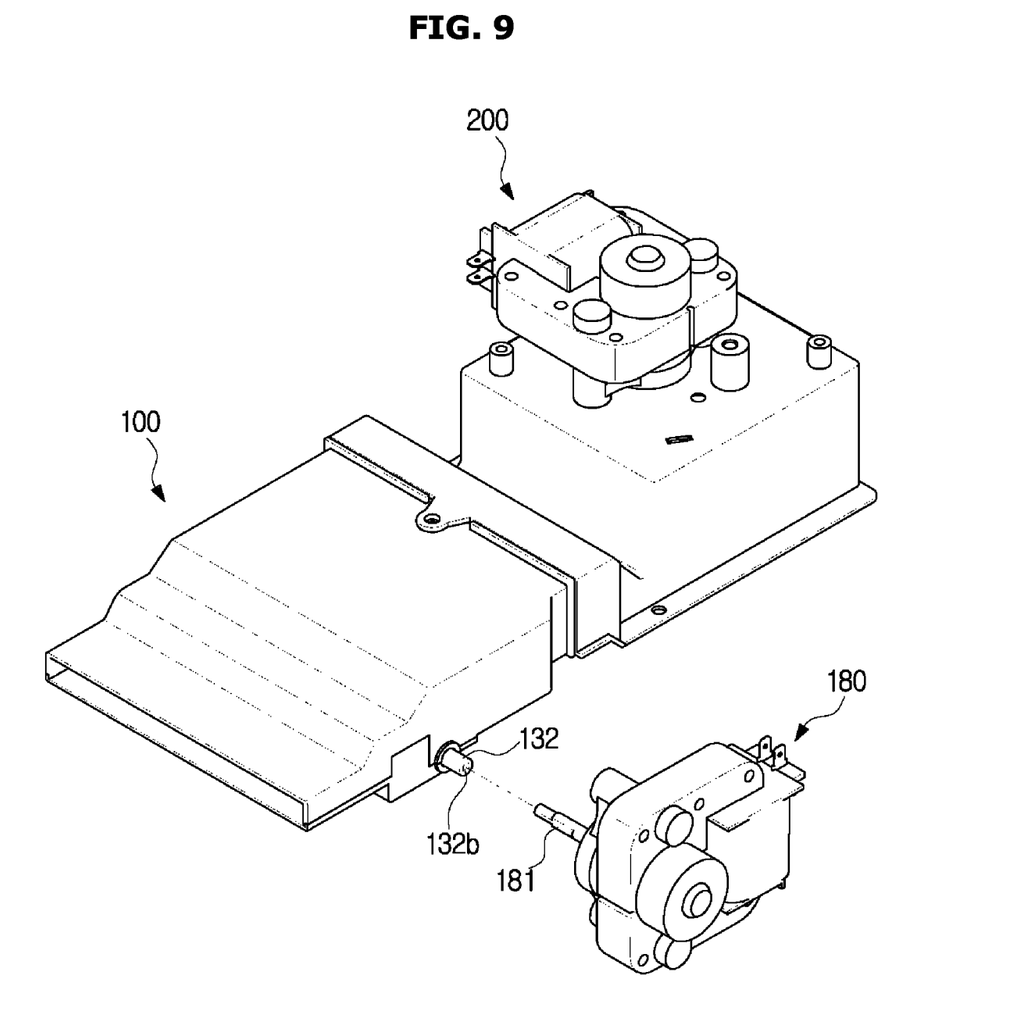
FIG. 9 shows a barrier module and peripheral components in the oven according to another embodiment of the disclosure.

FIG. 9 shows the barrier module and peripheral components in the oven according to another embodiment of the disclosure.

As illustrated in FIG. 9, in the oven according to another embodiment of the disclosure, the barrier module 100 may include a driving motor 180 for rotating the barrier 130. The driving motor 180 may include a driving shaft 181. The driving shaft 181 may be inserted in a hole 132b formed in the shaft portion 132 of the barrier 130. A cross section of the driving shaft 181 may be not a circle to prevent a relative rotation. A cross section of the hole 132b formed in the shaft portion 132 may correspond to a cross section of the driving shaft 181.

The barrier 130 may rotate in the first direction or the second direction by a driving force of the driving motor 180.

When the door 30 is opened, the driving motor 180 may rotate the barrier 130 in the first direction. When the door 30 is closed, the driving motor 180 may rotate the barrier 130 in the second direction.

Although not shown, according to another embodiment of the disclosure, the barrier module may open or close the passage according to temperature of the passage. The barrier module may close the passage when the temperature of the passage rises to predetermined temperature or higher. The barrier module may open the passage when the temperature of the passage falls to predetermined temperature or lower.

While the disclosure has been particularly described with reference to exemplary embodiments, it should be understood by those of skilled in the art that various changes in form and details may be made without departing from the spirit and scope of the disclosure.

The invention claimed is:

1. An oven comprising:
a main body;
a cooking chamber provided inside the main body, wherein a front side of the cooking chamber opens;
a door installed on the main body to open or close the cooking chamber;
a camera positioned above the cooking chamber, and configured to photograph an inside of the cooking chamber; and
a barrier module inside which the camera is positioned, the barrier module configured to allow or block an inflow of outside air to the camera according to opening or closing of the door.

2. The oven according to claim 1, wherein
the barrier module allows outside air to flow to the camera when the door is in a closed state, and
the barrier module blocks outside air from flowing to the camera when the door is in an opened state.

3. The oven according to claim 1, wherein the barrier module comprises:
an air guide forming a passage communicating the camera with an outside of the main body such that outside air flows to the camera; and
a barrier rotatably mounted on one side of the air guide.

4. The oven according to claim 3, wherein the barrier rotates to open or close the passage.

5. The oven according to claim 3, wherein
the barrier module further comprises a push pin moving forward or backward according to opening or closing of the door, and
the push pin comprises an auxiliary pin extending in a direction crossing the push pin.

6. The oven according to claim 5, wherein the barrier module further comprises a link connector including a first hole in which the auxiliary pin is inserted and a second hole in which one end of the barrier is inserted.

7. The oven according to claim 6, wherein
the link connector rotates in a first direction together with the barrier when the push pin moves forward, and
the link connector rotates in a second direction that is opposite to the first direction together with the barrier when the push pin moves backward.

8. The oven according to claim 7, wherein
the barrier closes the passage when the barrier rotates in the first direction, and
the barrier opens the passage when the barrier rotates in the second direction.

9. The oven according to claim 5, wherein the barrier module further comprises a first elastic member elastically biasing the push pin to move the push pin forward.

10. The oven according to claim 7, wherein the barrier module further comprises a second elastic member elastically biasing the link connector to rotate the link connector in the first direction.

11. The oven according to claim 3, wherein
one end of the passage is provided with an inlet through which outside air is introduced, and
the inlet is positioned in a front, upper portion of the main body.

12. The oven according to claim 3, wherein the barrier module further comprises a motor configured to rotate the barrier such that the barrier opens or closes the passage.

13. The oven according to claim 12, wherein
the motor rotates the barrier such that the barrier closes the passage when the door is opened, and
the motor rotates the barrier such that the barrier opens the passage when the door is closed.

14. The oven according to claim 12, wherein
the motor rotates the barrier such that the barrier closes the passage when temperature of the passage rises to predetermined temperature or higher, and
the motor rotates the barrier such that the barrier opens the passage when the temperature of the passage falls to predetermined temperature or less.

15. The oven according to claim 1, further comprising a camera cooling fan positioned above the camera, and configured to suck outside air toward the camera to cool the camera.

16. The oven according to claim 1, wherein the barrier module includes:
a passage communicating the camera with an outside of the main body such that outside air flows to the camera when the door is closed to cool the camera, and
a barrier mounted at an interior portion of the passage directly above the cooking chamber and configured to rotate when the door is opened so as to block outside air from flowing to the camera.

17. The oven according to claim 16, wherein the passage includes an inlet disposed above the door through which outside air is introduced into the passage.

18. The oven according to claim 16, wherein
the barrier includes a blocking portion to block the passage to outside air from flowing to the camera, and
an area of the blocking portion corresponds to a cross-sectional area of the passage.

* * * * *